(12) United States Patent
Kobayashi

(10) Patent No.: US 7,351,182 B2
(45) Date of Patent: Apr. 1, 2008

(54) DRIVE APPARATUS FOR HYBRID VEHICLE AND CONTROL METHOD THEREOF

(75) Inventor: Yasuhiko Kobayashi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 241 days.

(21) Appl. No.: 11/258,184

(22) Filed: Oct. 26, 2005

(65) Prior Publication Data

US 2006/0089235 A1    Apr. 27, 2006

(30) Foreign Application Priority Data

Oct. 27, 2004  (JP) ............................ 2004-312624
Nov. 4, 2004   (JP) ............................ 2004-320799

(51) Int. Cl.
*B60W 10/02* (2006.01)
*B60W 10/04* (2006.01)

(52) U.S. Cl. ........................................... 477/5; 903/946

(58) Field of Classification Search ...... 180/65.2–65.4, 180/65.6, 65.7; 477/3, 5; 903/921, 922, 903/925, 914, 946, 912
See application file for complete search history.

(56) References Cited

U.S. PATENT DOCUMENTS

| | | | |
|---|---|---|---|
| 6,018,198 A * | 1/2000 | Tsuzuki et al. ............... | 290/17 |
| 6,176,807 B1 * | 1/2001 | Oba et al. ...................... | 477/5 |
| 6,524,219 B2 * | 2/2003 | Mesiti et al. ................... | 477/5 |
| 6,581,705 B2 | 6/2003 | Phillips et al. | |
| 6,629,027 B2 * | 9/2003 | Yamaguchi et al. .......... | 701/22 |
| 6,852,062 B1 * | 2/2005 | Ahner et al. ................... | 477/2 |
| 6,997,275 B2 * | 2/2006 | Mesiti et al. .............. | 180/65.2 |
| 7,131,510 B2 * | 11/2006 | Mesiti et al. .............. | 180/65.2 |
| 7,192,382 B2 * | 3/2007 | Imazu et al. .................. | 477/5 |
| 2003/0153429 A1 * | 8/2003 | Boll .............................. | 477/6 |

FOREIGN PATENT DOCUMENTS

| | | |
|---|---|---|
| JP | A-2003-129926 | 5/2003 |
| JP | A-2003-212003 | 7/2003 |
| JP | A-2003-237383 | 8/2003 |
| JP | A-2003-293816 | 10/2003 |

\* cited by examiner

*Primary Examiner*—Sherry Estremsky
(74) *Attorney, Agent, or Firm*—Oliff & Berridge, PLC

(57) ABSTRACT

A drive apparatus includes a motor, a first clutch that transmits and cuts off driving force between the motor and an engine, a second clutch that transmits and cuts off driving force to a wheel side from either or both of the motor and the engine, and a control device that performs operation control for the motor, the first clutch and the second clutch. If there is an engine start request during driving of the wheel by the motor, the control device starts the engine by performing the operation control for the motor, the first clutch and the second clutch based upon control patterns that differ depending on a rotational speed of the motor that is directly or indirectly detected.

20 Claims, 7 Drawing Sheets

DRIVE APPARATUS FOR HYBRID VEHICLE AND CONTROL METHOD THEREOF

The disclosures of Japanese Patent Applications No. 2004-320799 filed on Nov. 4, 2004, and 2004-312624, filed on Oct. 27, 2004, from which priority is claimed, including the specification, drawings and abstract are incorporated herein by reference in their entireties.

This application is related to a U.S. patent application entitled Drive Apparatus for Hybrid Vehicle and Control Method and Control Device Therefor, to be filed by Oct. 26, 2005, Ser. No. 11,257,998, the disclosure of which is incorporated herein by reference thereto.

BACKGROUND

The disclosure relates to a drive apparatus mounted in a hybrid vehicle, which runs using both an engine and a motor, and a control method thereof.

Art related to a control during engine starting in a drive apparatus mounted in a hybrid vehicle, which runs using both an engine and a motor can be found, for example, in U.S. Pat. No. 6,581,705 (cols. 1-6, FIGS. 1, 2A and 2B) of the family of Japanese Patent Laid-Open Publication No. 2003-129926 (pages 1-5, FIGS. 1 and 2) described below. The art is a control art for a parallel hybrid vehicle with an engine disconnect clutch, whose purpose is to engage the engine disconnect clutch and start the engine, while also maintaining a smooth vehicle response to a driver request using the motor. In this case, the motor is controlled throughout engine starting in a speed following control mode, which performs a control adapted to however much torque is required to obtain a desired setting speed. In other words, during engine starting, the engine disconnect clutch is first engaged and then the desired speed is issued to the motor, after which fuel is supplied to the engine to start the engine. Thereafter, a control is performed that calculates the desired engine torque, and then gradually decreases the motor torque while increasing the engine torque a proportional amount. This continues until the motor torque reaches zero. The vehicle speed is maintained throughout using, for example, a proportional/integral controller.

In this case, the desired motor speed is set based upon a request from the driver and the overall vehicle operating condition. Either a trajectory or constant value therefor may be obtained based upon the acceleration and the vehicle speed at the present time and at a past point in time. On the other hand, the desired setting speed can be set to the desired engine idling speed if the driver has not instructed the present operating torque and a power transmission unit, such as an automatic transmission or the like, for transmitting driving force from the engine and the motor is not engaged.

SUMMARY

However, in the above-described control during engine starting of the hybrid vehicle drive apparatus, if there is an engine start request when the vehicle is running off the driving force of the motor with the power transmission unit engaged, it may not be possible in some cases to suitably start the engine, depending on vehicle operating conditions including the motor rotational speed. More specifically, an engine crankshaft must be rotated at constant or faster rotational speed in order to start the engine. For example, if the vehicle is running at a low vehicle speed off the driving force of the motor with the power transmission unit engaged, the motor rotational speed is also controlled to be low in accordance with the vehicle speed. Consequently, if the motor rotational speed is lower than a rotational speed capable of starting the engine, then the engine cannot be immediately started while running at that vehicle speed.

In view of the foregoing issues, it is an object to provide a drive apparatus for a hybrid vehicle capable of starting an engine in a short time regardless of vehicle operating conditions, including a motor rotational speed, if there is an engine start request when a vehicle is running off the driving force of a motor.

Accordingly, if there is an engine start request during driving of a wheel by the motor, operation controls for the motor, a first clutch and a second clutch are performed based upon control patterns that differ depending on the rotational speed of the motor. Therefore, the optimum control pattern can be applied in accordance with vehicle operating conditions including the motor rotational speed, and the engine can be reliably started in a short time.

By having two control patterns, that is, a control pattern for high speed and a control pattern for low speed, simple control algorithms can be used to reliably start the engine in a short time in accordance with vehicle operating conditions including the motor rotational speed.

Even if the rotational speed of the motor is less than a rotational speed at which the engine can be started when there is an engine start request during driving of the wheel by the motor, the engine can be reliably started in a short time. This is achieved by applying the corresponding control pattern for low speed.

Furthermore, if the rotational speed of the motor is less than a predetermined threshold when there is an engine start request during driving of a wheel by the motor, a control is performed that starts the engine with the second clutch in a released state. Therefore, the engine can be reliably started while maintaining a smooth operating state of the vehicle, but without transmitting fluctuations in the motor rotational speed during engine starting to the wheel side.

However, if the rotational speed of the motor is less than a predetermined threshold when there is an engine start request during driving of the wheel by the motor, the engine is cranked and started by rotation of the motor with the first clutch engaged and the second clutch in a released state. After the engine is started, the first clutch is released and the second clutch is engaged. Therefore, the engine can be reliably started while maintaining a smooth operating state of the vehicle, but without transmitting fluctuations in the motor rotational speed during engine starting to the wheel side or fluctuations in driving force upon engagement of the first clutch.

In addition, the second clutch is engaged with the rotational speeds on the motor side and wheel side of the second clutch almost identical. Therefore, the absorption of the difference in rotational speeds on both sides when engaging the second clutch makes it possible to suppress driving force fluctuations and transmission thereof to the wheel side. Consequently, a smooth vehicle operating state can be maintained.

Furthermore, a structure is conceivable where the friction loads or the like acting on the second clutch are small. This consequently lengthens the life of the second clutch. Alternatively, although almost incapable of transmitting driving force while slipping, a low-cost clutch may also be used as the second clutch. It is thus possible to structure the second clutch using clutches, brakes, or the like inside an automatic transmission already in general use.

In a state where the second clutch is released and the driving force of the motor is not transmitted to the wheel side, a control is performed that maintains the motor rotational speed as equal to or greater than a rotational speed required for engine starting. The engine can therefore be reliably started regardless of the magnitude of the torque required for engine starting. Furthermore, in a state where the second clutch is engaged and the driving force of the motor is transmitted to the wheel side, the motor can be operated to run the vehicle in response to a torque request based upon a driver's accelerator pedal operation.

Additionally, if the rotational speed of the motor is less than a rotational speed at which the engine can be started when there is an engine start request during driving of the wheel by the motor, the engine can be reliably started in a short time.

BRIEF DESCRIPTION OF THE DRAWINGS

The disclosure will be made with reference to the drawings in which.

DETAILED DESCRIPTION OF EMBODIMENT

Figure 1:
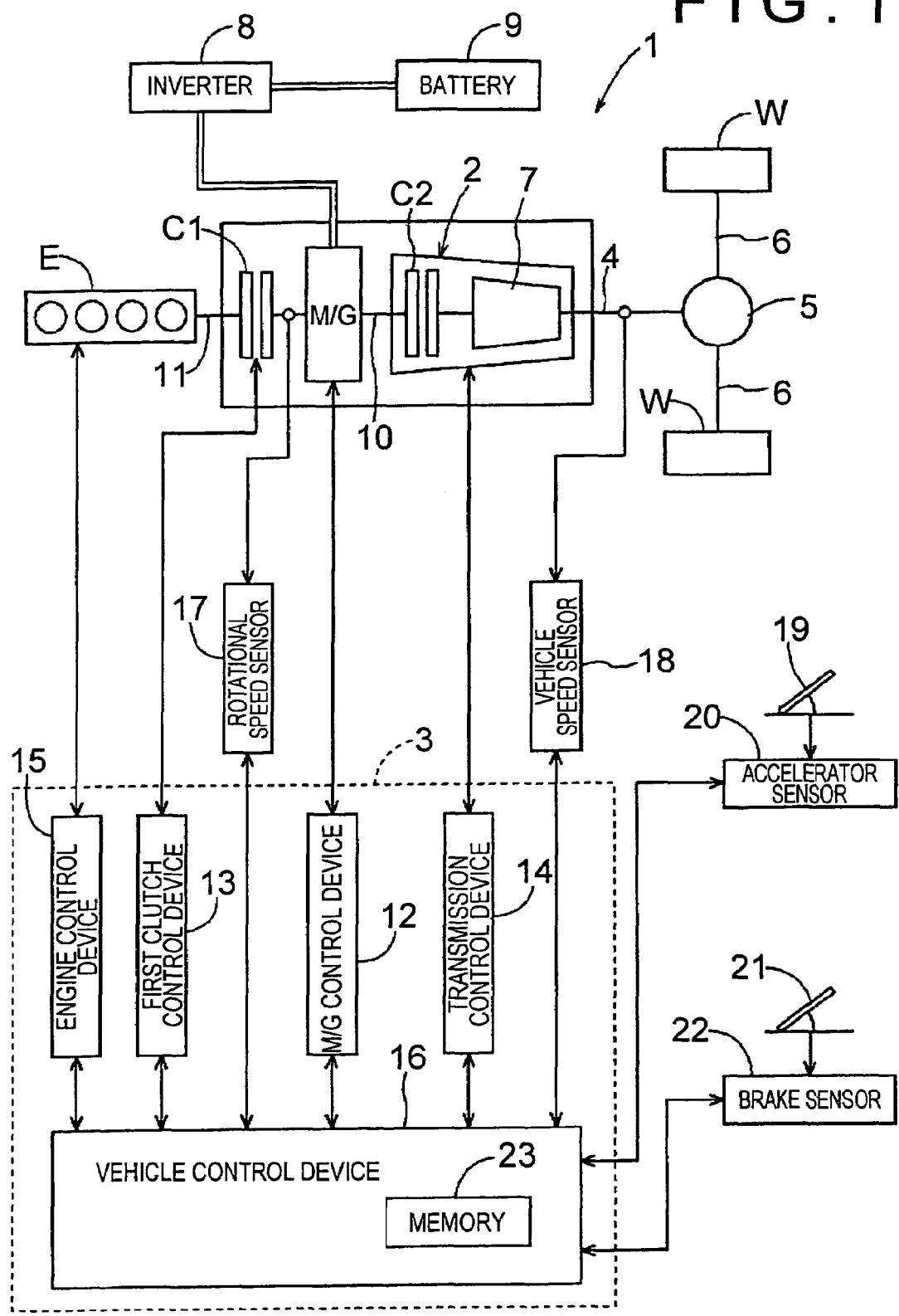
FIG. 1 is a schematic diagram showing a system configuration outline of a drive apparatus for a hybrid vehicle according to an exemplary embodiment.

Hereinafter, an exemplary embodiment preferably employed in a hybrid vehicle that runs using both an engine and a motor, will be described with reference to the accompanying drawings. A drive apparatus 1 according to the embodiment is mounted in a hybrid vehicle as shown in FIG. 1. It is a device that transmits driving force from either or both of a motor/generator M/G and an engine E to a wheel W and, when the engine E is stopped, also transmits the driving force of the motor/generator M/G to the engine E to start the engine E. Hence, the drive apparatus 1 is structured with the motor/generator M/G, a first clutch C1, a transmission 2, that also functions as a second clutch C2, and a control device 3 that performs operation control for these units. The clutch C1 transmits and cuts off driving force between the motor/generator M/G and the engine E. The transmission 2 is disposed between the motor/generator M/G and the wheel W, and transmits and cuts off driving force to either or both of the motor/generator M/G and the engine E. Furthermore, an output shaft 4 of the transmission 2 is connected to a differential gear 5, from which driving force is transmitted to the wheel W via a drive shaft 6. In this case, an internal combustion engine, such as a gasoline engine, diesel engine, or the like, is preferably used as the engine E.

As FIG. 1 shows, the system configuration of the drive apparatus 1 can be represented as a structure following a transmission route of driving force and connected in series in the order of the engine E, the first clutch C1, the motor/generator M/G, the transmission 2 also functioning as the second clutch C2, and the wheel W. Also note, that in FIG. 1, the internal portion of the transmission 2 is functionally represented as separated into the second clutch C2 and a speed change mechanism 7 in order to plainly show the system configuration of the drive apparatus 1 according to the embodiment.

The motor/generator M/G receives a supply of electric power from a battery 9, which has been converted from DC to AC by an inverter 8, and rotationally drives an intermediate shaft 10. One end of the intermediate shaft 10 is connected to a crankshaft 11 that synchronously rotates with a crankshaft (not shown) of the engine E, via the first clutch C1. Meanwhile, the other end is connected to the speed change mechanism 7 of the transmission 2 via the second clutch C2. Accordingly, the motor/generator M/G has a structure capable of starting (cranking) the engine E while the first clutch C1 is engaged, and capable of driving the wheel W while the second clutch C2 is engaged.

In addition, the motor/generator M/G is capable of operating as a generator while the intermediate shaft 10 is being driven by a driving force from the engine E or the wheel W side. In this case, the electric power generated by the motor/generator M/G is converted from AC to DC by the inverter 8 and stored in the battery 9. The operation control of the motor/generator M/G is performed based upon a control signal from an M/G control device 12.

The first clutch C1 is disposed between the motor/generator M/G and the engine E. It connects and separates the intermediate shaft 10, rotationally driven by the motor/generator M/G, and the crankshaft 11, synchronously rotating with the crankshaft (not shown) of the engine E. Driving force is thus transmitted and cut off between the engine E and the motor/generator M/G.

Accordingly, when the engine E is stopped, engagement of the first clutch C1 makes it possible to transmit a driving force from the motor/generator M/G to the engine E in order to start the engine E. While the engine E is operating, engagement of the first clutch C1 enables the transmission of driving force from the engine E to the wheel W via the transmission 2.

For use as the first clutch C1 described above, a clutch, such as a wet multiple disc clutch or the like, is preferable, that is capable of drive force transmission while slipping in a half-engaged state between a state of initiation of engagement and full engagement. The operation control of the first clutch C1 is performed based upon a control signal from a first clutch control device 13.

The transmission 2 is disposed between the motor/generator M/G and the wheel W. It changes the speed of input rotation from the intermediate shaft 10, rotationally driven by the driving force of either or both the motor/generator M/G and the engine E, to a desired gear ratio, which is then output to the output shaft 4. Moreover, the transmission 2 transmits and cuts off such driving force (rotation) to the output shaft 4.

For use as the transmission 2 described above, a multi-speed or continuously variable automatic transmission is preferable. In the embodiment, a stepped automatic transmission with six speeds, etc. is used, for example, as the transmission 2. Such a transmission 2 includes a planetary gear train for changing to a desired gear ratio the speed of input rotation that is transmitted via the intermediate shaft 10 and output to the output shaft 4, as well as clutches and brakes for performing an operation control of the planetary gear train. Furthermore, the transmission 2 is capable of switching to a desired speed by engaging and releasing the clutches and brakes, and also capable of maintaining an idling (neutral) state in which driving force input from the intermediate shaft 10 is not transmitted to the output shaft 4.

In other words, the transmission 2 is capable of switching between two states: 1) a transmission state in which driving force of a selected desired speed is input from the intermediate shaft 10 and transmitted to the output shaft 4, and 2) an idling state in which such driving force is not transmitted to the output shaft 4. In this manner, the transmission 2 also functions as the second clutch C2. Thus as described above, from a functional standpoint, the transmission 2 can be considered as having the second clutch C2 and the speed change mechanism 7. The operation control of the transmission 2 is performed based upon a control signal from a transmission control device 14.

The control device 3 is provided with an engine control device 15, that performs an operation control for the engine E; the M/G control device 12, that performs the operation control for the motor/generator M/G; the first clutch control device 13, that performs the operation control for the first clutch C1; the transmission control device 14, that performs the operation control for the transmission 2; and a vehicle control device 16, that performs an operation control for the entire vehicle.

Furthermore, the vehicle control device 16 is configured to have respective detection signals input from a rotational speed sensor 17 that detects a rotational speed of the intermediate shaft 10 (which coincides with a rotational speed Rmg of the motor/generator M/G in the present embodiment); a vehicle speed sensor 18 that detects a rotational speed of the output shaft 4 of the transmission 2; an accelerator sensor 20 that detects a depressed amount (accelerator opening) of an accelerator pedal 19; and a brake sensor 22 that detects a depressed amount of a brake pedal 21. In addition, stored in a memory 23 of the vehicle control device 16 is a status flag (to be described later) set by the vehicle control device 16 based upon information from various portions of the vehicle.

The operation control of the drive apparatus 1 according to the embodiment will be described with reference to the accompanying drawings. As FIGS. 2 to 7 show, in the embodiment, the control device 3 performs a start control of the engine E, which follows two control patterns depending on the rotational speed Rmg of the motor/generator M/G, when there is an engine E start request during driving of the wheel W by only the motor/generator M/G. The two control patterns are: 1) a control pattern for high speed (control processing for "engine starting during high speed") and 2) a control pattern for low speed (control processing for "engine starting during low speed"). Operation control of the drive apparatus 1 according to the embodiment will be described in detail, centering on the operation control for starting of the engine E as mentioned above.

Figure 2:
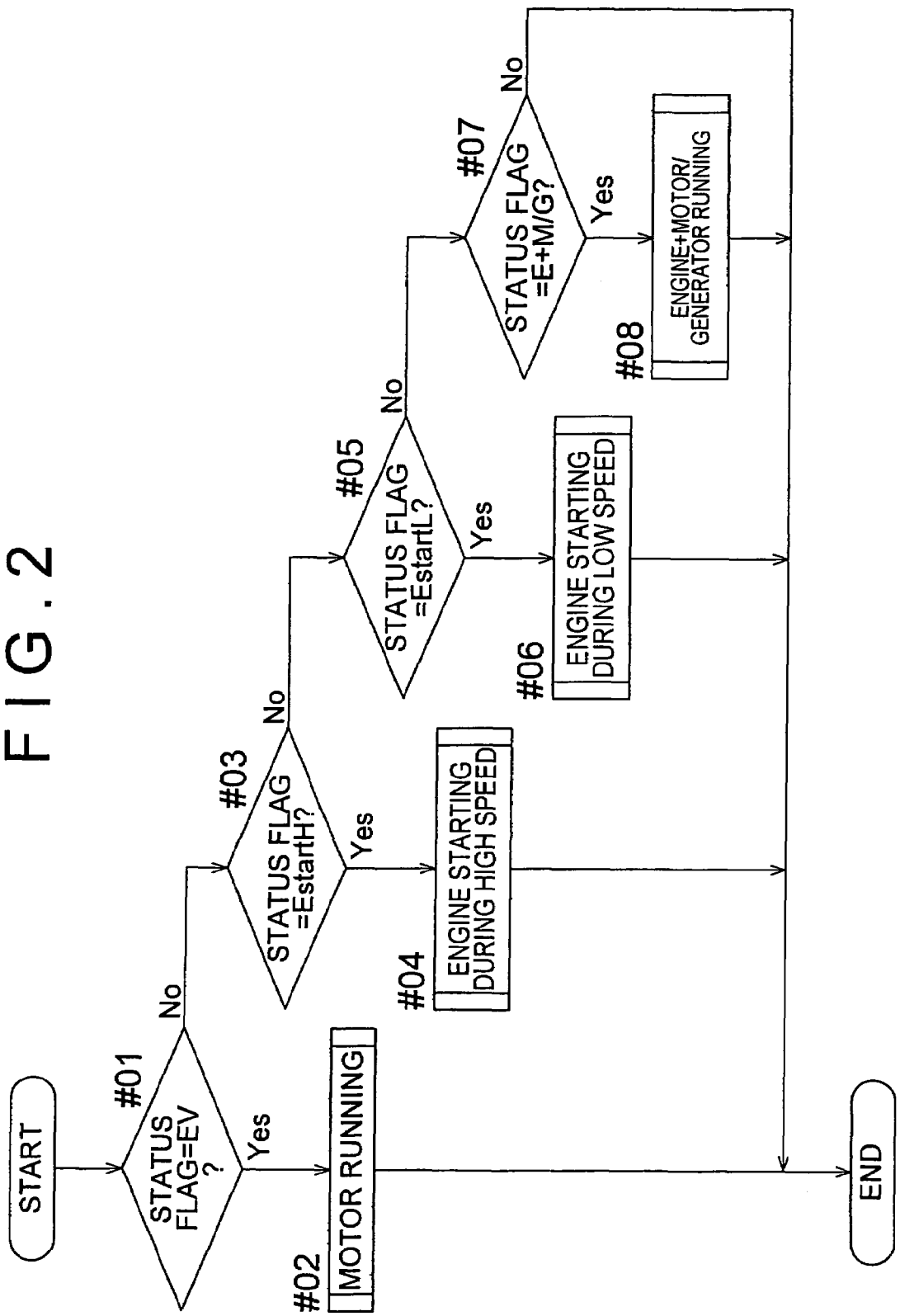
FIG. 2 is a flowchart showing a selection processing flow of control processing in the drive apparatus for a hybrid vehicle according to the exemplary embodiment.

FIG. 2 is a flowchart showing a processing flow in the control device 3 in the drive apparatus 1 according to the embodiment when any one of four control processes are selected, the control processes being: 1) motor running, 2) engine starting during high speed, 3) engine starting during low speed, and 4) engine+motor/generator running. As the figure shows, if the status flag stored in the memory 23 is set to "EV", a state which indicates motor running (YES in step #01), the control device 3 selects and executes the control processing for motor running (step #02). If the status flag is set to "EstartH", a state which indicates engine starting during high speed (YES in step #03), the control device 3 selects and executes the control processing for engine starting during high speed (step #04). If the status flag is set to "EstartL", a state which indicates engine starting during low speed (YES in step #05), the control device 3 selects and executes the control processing for engine starting during low speed (step #06). Furthermore, if the status flag is set to "E+M/G", a state which indicates engine+motor/generator running (YES in step #07), the control device 3 selects and executes the control processing for engine+motor/generator running (step #08).

Thus, the status flag is set in the vehicle control device 16 based upon information from various portions of the vehicle, including the accelerator sensor 20, the brake sensor 22, the vehicle speed sensor 18, and the rotational speed sensor 17. Moreover, the status flag is stored in the memory 23. More specifically, it should also be noted that the status flag can be set based upon a comparison of information from various portions of the vehicle and a running condition map that uses such information as parameters.

Figure 3:
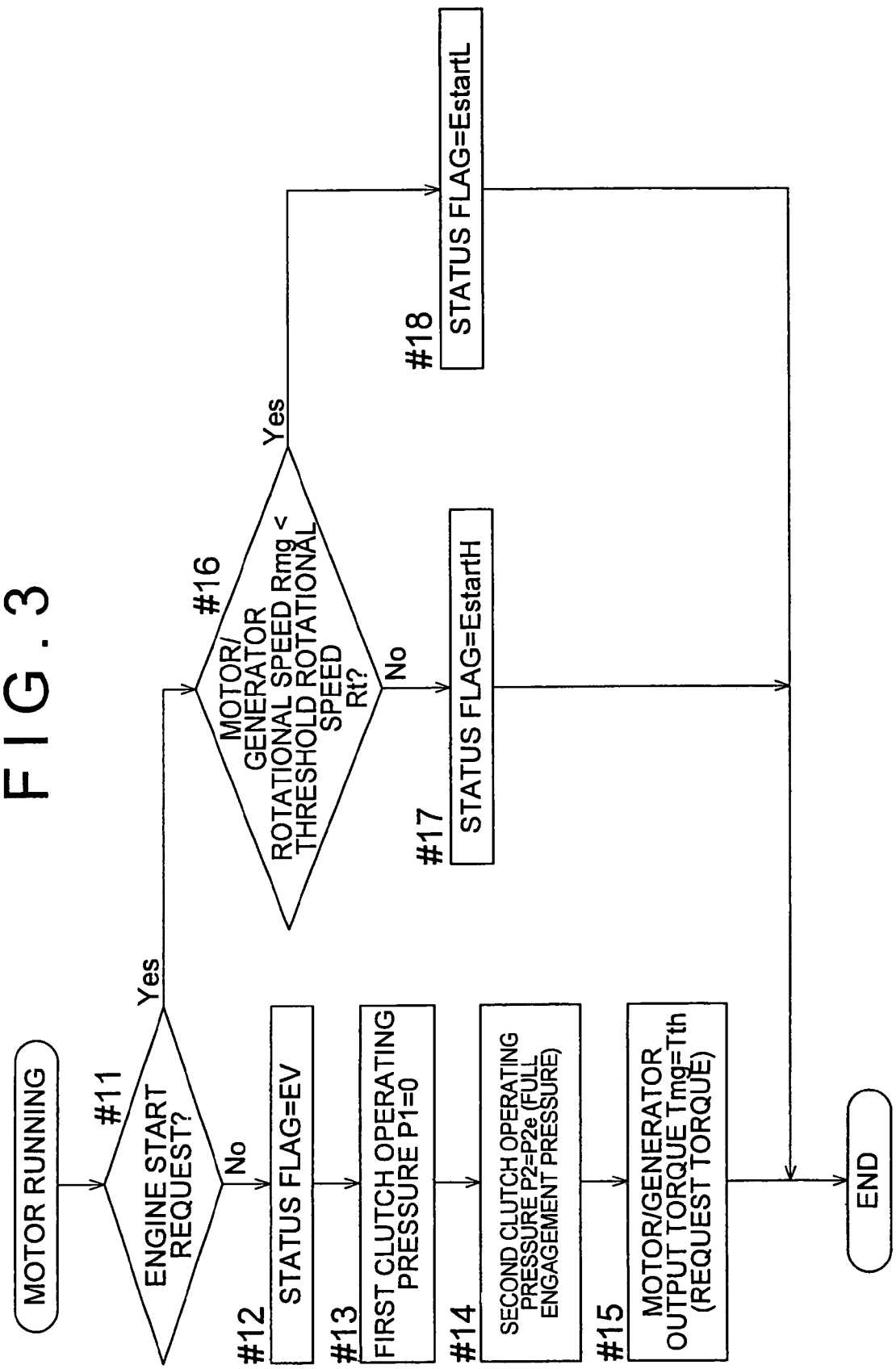
FIG. 3 is a flowchart showing the details of control processing for motor running in step #02 of FIG. 2.

FIG. 3 is a flowchart showing the details of the control processing for motor running in step #02 of the flowchart in FIG. 2. As the figure shows, in the control processing for motor running, until there is an engine start request (NO in step #11), the status flag stored in the memory 23 stays set to "EV", which indicates motor running (step #12). In this case, the engine start request is output from the vehicle control device 16 to the engine control device 15, the M/G control device 12, the first clutch control device 13, and the transmission control device 14. It is output in cases such as when the accelerator opening increases and sufficient output torque cannot be generated by the motor/generator M/G alone, or when the remaining amount in the battery 9 for driving the motor/generator M/G becomes small.

Next, the control device 3 sets an operating pressure P of the first clutch C1 to zero (step #13), and sets an operating pressure P2 of the second clutch C2 to a full engagement pressure P2e at which the second clutch C2 reaches a state of full engagement (step #14). In addition, the control device 3 operates the motor/generator M/G such that an output torque Tmg of the motor/generator M/G coincides with a request torque Tth (step #15).

The request torque Tth is set in the vehicle control device 16 based upon information regarding the accelerator opening detected by the accelerator sensor 20. At this time, the output torque may differ with respect to the accelerator opening during running by the engine and running by the motor/generator M/G. To prevent this, the relationship between the accelerator opening and the output torque Tmg of the motor/generator M/G should preferably match a relationship between the accelerator opening and the output torque of the engine. Accordingly, the request torque Tth here is set according to the accelerator opening detected by the accelerator sensor 20 so as to coincide with, or be the equivalent of, the output torque of the engine for the accelerator opening at that time. Thus, the driver feels no differences during motor running, and motor running can be achieved that reflects an output request based on the accelerator operation of the driver.

Next, if there is an engine start request (YES in step #11), the control device 3 determines whether a rotational speed Rmg of the motor/generator M/G is less than a threshold rotational speed Rt (step #16). In the embodiment, the rotational speed Rmg of the motor/generator M/G is detected based upon the detection signal from the rotational speed sensor 17, which detects the rotational speed of the intermediate shaft 10.

The threshold rotational speed Rt is set to a rotational speed equal to or greater than a rotational speed of the motor/generator M/G capable of starting the engine E when the first clutch C1 is in a state of full engagement. That is, the threshold rotational speed Rt is set so as to become equal to or greater than a rotational speed at which a cranking rotational speed of the engine E is capable of starting the engine E using the driving force from the motor/generator M/G when the first clutch C1 is in a state of full engagement. More specifically, it should be set to approximately the idling rotational speed of the engine E, preferably about 600 to 700 rpm, for example.

If the rotational speed Rmg of the motor/generator M/G is less than the threshold rotational speed Rt (NO in step #16), the control device 3 sets the status flag stored in the memory 23 to "EstartH", which indicates engine starting during high speed (step #17). Thus, the control (step #04) for engine starting during high speed is performed as shown in the flowchart of FIG. 2. However, if the rotational speed Rmg of the motor/generator M/G is less than the threshold rotational speed Rt (YES in step #16), the control device 3 sets the status flag stored in the memory 23 to "EstartL", which indicates engine starting during low speed (step #18). Thus, the control (step #06) for engine starting during low speed is performed as shown in the flowchart of FIG. 2. The control processing for motor running is then ended.

Figure 4:
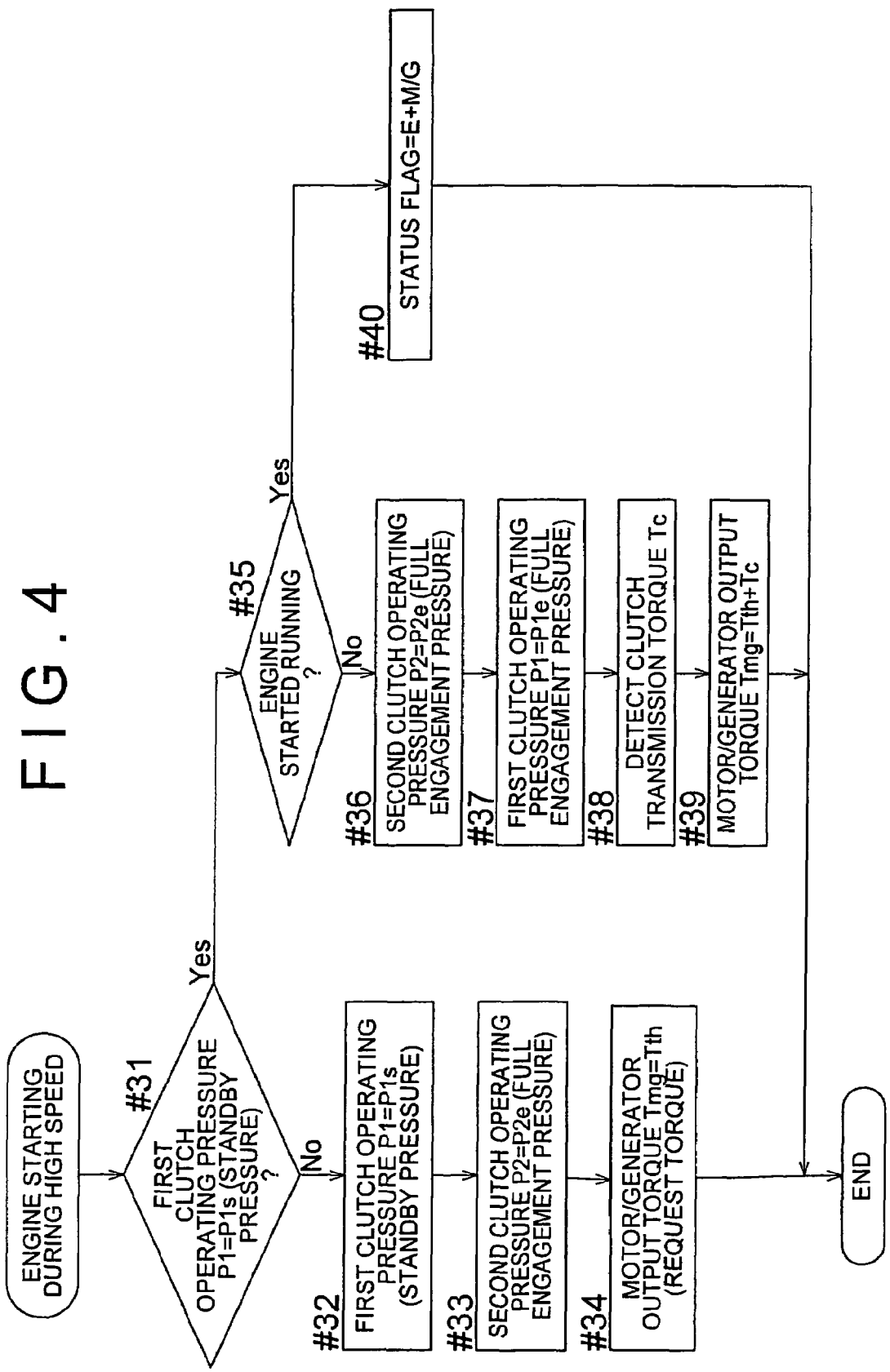
FIG. 4 is a flowchart showing the details of control processing for engine starting during high speed in step #04 of FIG. 2.

FIG. 4 is a flowchart showing the details of the control processing for engine starting during high speed in step #04 of the flowchart in FIG. 2. As the figure shows, in the control processing for engine starting during high speed, the control device 3 first determines whether the operating pressure P1 of the first clutch C1 has reached a standby pressure P1s (step #31). If the operating pressure P1 of the first clutch C1 does not equal the standby pressure P1s (NO in step #31), then the control device 3 sets the operating pressure P1 of the first clutch C1 to the standby pressure P1s (step #32). The standby pressure P1s of the first clutch C1 here is a pressure for setting the first clutch C1 in a preparation state prior to initiation of engagement, i.e., the standby pressure P1s is preferably a pressure that operates the first clutch C1 until the state immediately prior to initiation of engagement.

Next, in a state where the operating pressure P2 of the second clutch C2 is set to a full engagement pressure P2e (step #33), the motor/generator M/G is operated so as to coincide the output torque Tmg of the motor/generator M/G with the request torque Tth (step #34).

However, if the operating pressure P1 of the first clutch C1 has reached the standby pressure P1s (YES in step #31), the control device 3 determines whether the engine E has started running (step #35). It is determined whether the engine has started running based upon detection signals input to the engine control device 15 from various sensors provided in the engine.

If the engine E has not started running (NO in step #35), the control device 3 leaves the operating pressure P2 of the second clutch C2 unchanged as equal to the full engagement pressure P2e (step #36). Meanwhile, the operating pressure P1 of the first clutch C1 is increased until it reaches a full engagement pressure P1e at which the first clutch C1 reaches a state of full engagement (step #37). Accordingly, an engagement pressure of the first clutch C1 can be increased. In the embodiment, a control for increasing the operating pressure P1 of the first clutch C1 up to the full engagement pressure P1e is a feedback control that detects a slipping amount of the first clutch C1 and then increases the operating pressure P1 of the first clutch C1 until the slipping amount reaches zero.

Next, a clutch transmission torque Tc, that is transmitted from the motor/generator M/G to the engine E side via the first clutch C1, is detected (step #38). The clutch transmission torque Tc is equivalent to a torque from the motor/generator M/G transmitted via the first clutch C1 that is used for cranking and starting the engine E.

Detection of the clutch transmission torque Tc can be achieved, for example, by calculating the clutch transmission torque Tc in the vehicle control device 16 based upon the operating pressure P1 of the first clutch C1. In other words, a control has been performed to increase the operating pressure P1 of the first clutch C1 at this time up to the full engagement pressure P1e (step #37). Thus, as the transmitted torque increases, so does the operating pressure P1 of the first clutch C1, whereby the first clutch C1 is accordingly engaged at the full engagement pressure P1e. Consequently, the operating pressure P1 of the first clutch C1 has a constant relationship with the clutch transmission torque Tc, which is transmitted by the first clutch C1. Therefore, it is possible to calculate the clutch transmission torque Tc in the vehicle control device 16, based upon the operating pressure P1 of the first clutch C1. For this purpose, an equation or a table is used that describes the relationship between the clutch transmission torque Tc and the operating pressure P1 of the first clutch C1.

Next, the control device 3 operates the motor/generator M/G such that the output torque Tmg of the motor/generator M/G reaches a torque that is the sum of the request torque Tth and the clutch transmission torque Tc (step #39). Thus, it is possible to start the engine E while the output request generated by the accelerator operation of the driver is reflected on the running motor. Also note that the request torque Tth, as described above, is set in the vehicle control device 16 based upon information regarding the accelerator opening detected by the accelerator sensor 20.

If the engine E has started running (YES in step #35), the control device 3 sets the status flag stored in the memory 23 to "E+M/G", which indicates engine+motor/generator running (step #40). Thus, the control (step #08) for engine+motor/generator running is performed as shown in the flowchart of FIG. 2. The control processing for engine starting during high speed is then ended.

Figure 6:
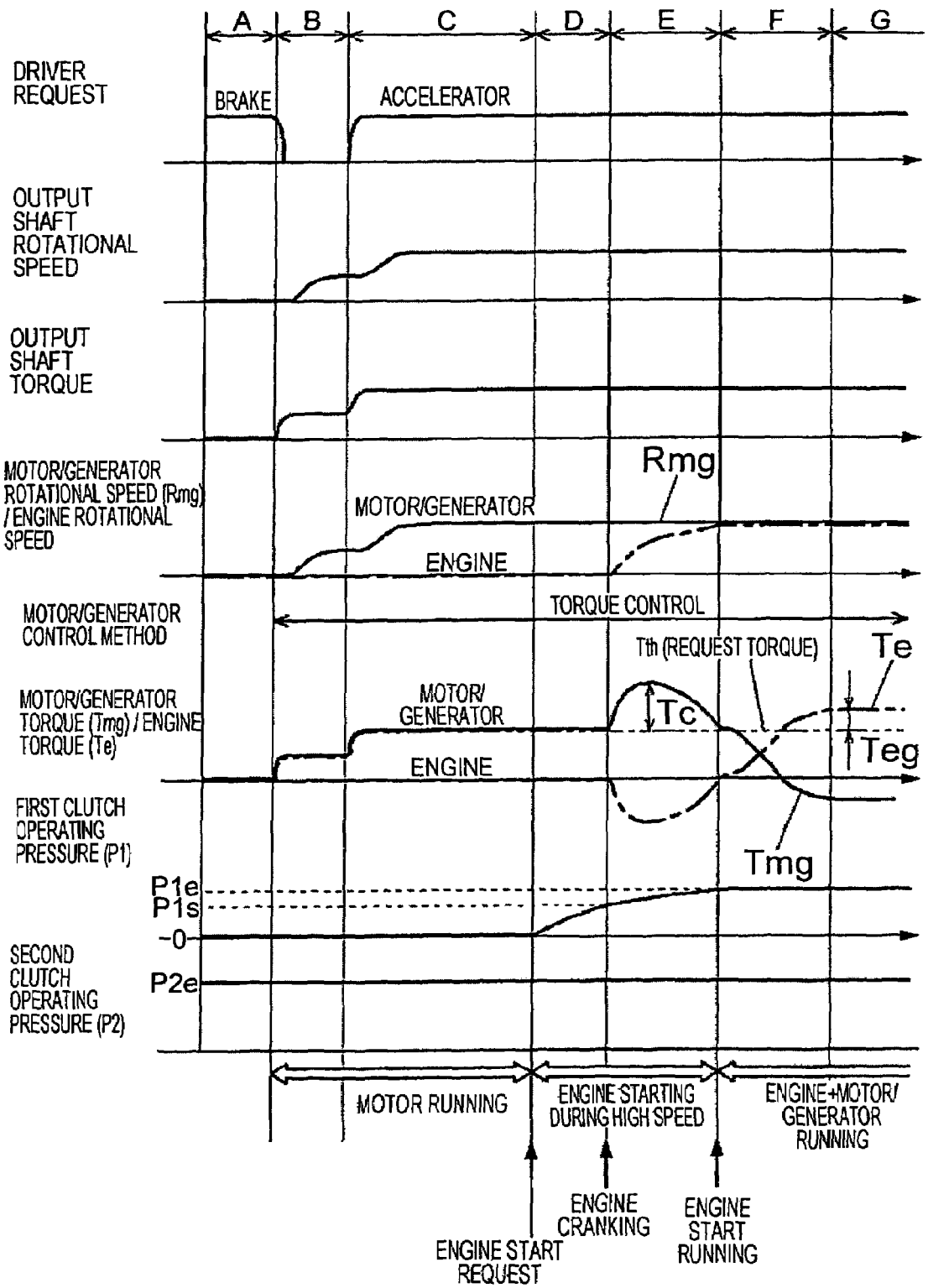
FIG. 6 is an example of a timing chart showing operating conditions of various portions when starting of an engine E is performed according to the control processing for "engine starting during high speed" in the drive apparatus for a hybrid vehicle according to the exemplary embodiment.

FIG. 6 is an example of a timing chart showing operating conditions of various portions when starting of an engine E is performed according to the control processing for "engine starting during high speed" after motor running is performed subsequent to the vehicle being stopped. In the example shown in the figure, the vehicle is stopped with the brake pedal being depressed by the driver (area A). Once the brake pedal is released by the driver, the control device 3 accordingly starts rotational driving of the motor/generator M/G. The control device 3 then outputs torque that slowly advances the vehicle, similar to the creeping of a vehicle with an automatic transmission that has a torque converter (area B). Thus, motor running is started. When the accelerator pedal 19 is subsequently depressed by the driver, the control device 3 operates the motor/generator M/G so as to coincide the output torque Tmg of the motor/generator M/G with the request torque Tth (see step #15 in FIG. 3), and performs motor running (area C).

Next, if an engine start request has been output from the vehicle control device 16, the control device 3 starts the control for engine starting during high speed. Namely, the operating pressure P1 of the first clutch C1 is set to the standby pressure P1s (see step #32 in FIG. 4), and the first clutch C1 is operated until it reaches the state immediately prior to initiation of engagement (area D). Thereafter, while the operating pressure P1 of the first clutch C1 continues to increase at a predetermined changing rate until it reaches the full engagement pressure P1e (see step #37 in FIG. 4). The motor/generator M/G is then operated such that the output torque Tmg of the motor/generator M/G reaches a torque that is the sum of the request torque Tth and the clutch transmission torque Tc (see step #39 in FIG. 4) to start the engine E (area E). Note that in the example shown in FIG. 6, the engine start request indicates a case in which such a request is output according to a decrease in the remaining amount in the battery 9, and not according to an increase in the accelerator opening.

After the engine E has started running, engine+motor/generator running is started. At this time, the output torque Tmg of the motor/generator M/G is decreased while an output torque Te of the engine E is increased, with the request torque Tth kept satisfied and unchanged. In this manner, the proportion of output torque Te of the engine E is continuously increased (area F). With the engine+motor/generator running in a steady state, the output torque Te of the engine E becomes equal to a torque that is the sum of the request torque Tth and a torque (electricity generating torque) Teg required for generating electricity by the motor/generator M/G. Thus while the vehicle runs on the output torque Te of the engine E, the motor/generator M/G is operated as a rotationally driven generator (area G).

It should be noted that during the series of operations shown in FIG. 6, the operating pressure P2 of the second clutch C2 remains unchanged as the full engagement pressure P2e. Furthermore, when the control processing for engine starting during high speed is being executed, the motor/generator M/G is controlled by a torque control throughout the regions B to G.

Figure 5:
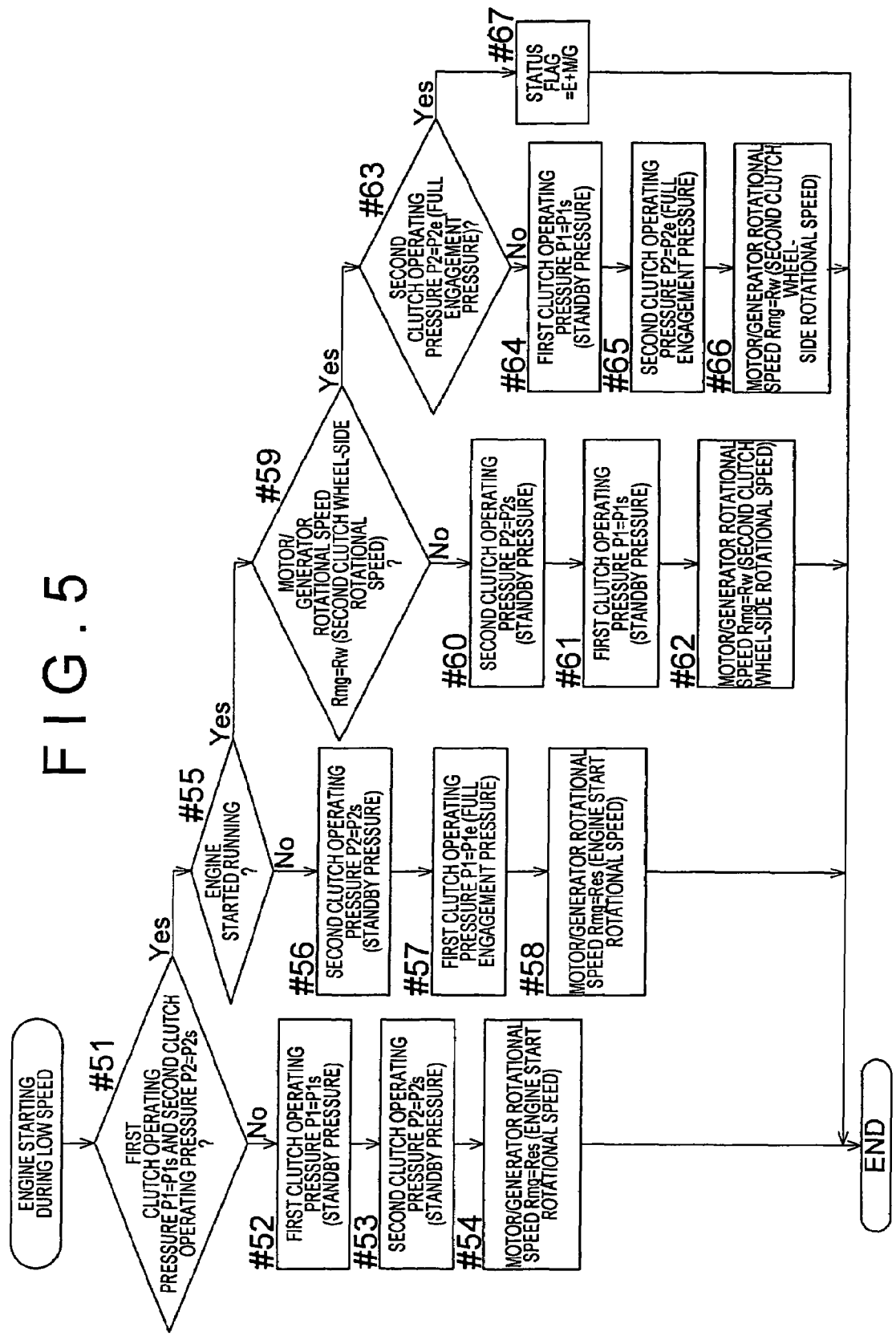
FIG. 5 is a flowchart showing the details of control processing for engine starting during low speed in step #06 of FIG. 2.

FIG. 5 is a flowchart showing the details of control processing for engine starting during low speed in step #06 of the flowchart in FIG. 2. As the figure shows, in the control processing for engine starting during low speed, the control device 3 first determines whether the operating pressure P1 of the first clutch C1 is the standby pressure P1s, and whether the operating pressure P2 of the second clutch C2 is the standby pressure P2s (step #51). If that is not the case (NO in step #51), then the control device 3 sets the operating pressure P1 of the first clutch C1 to the standby pressure P1s (step #52). The standby pressure P1s of the first clutch C1 here is a pressure for setting the first clutch C1 in a preparation state prior to initiation of engagement, i.e., the standby pressure P1s is preferably a pressure that operates the first clutch C1 until the state immediately prior to initiation of engagement.

Next, the control device 3 sets the operating pressure P2 of the second clutch C2 to the standby pressure P2s (step #53). The standby pressure P2s of the second clutch C2 here is a pressure for setting the second clutch C2 in a released state. It may also be set as an arbitrary pressure between zero pressure and a pressure for setting the second clutch C2 in a state immediately prior to initiation of engagement.

Next, the control device 3 performs a rotational speed control so as to maintain the rotational speed Rmg of the motor/generator M/G at an engine start rotational speed Res (step #54). The engine start rotational speed Res, similar to the threshold rotational speed Rt, is set to a rotational speed equal to or greater than a rotational speed of the motor/generator M/G capable of starting the engine E when the first clutch C1 is in a state of full engagement. More specifically, it should be set to approximately the idling rotational speed of the engine E, preferably about 600 to 700 rpm, for example.

Note that such a rotational speed control for maintaining the rotational speed Rmg of the motor/generator M/G at a predetermined rotational speed can be performed by controlling the output torque Tmg of the motor/generator M/G, such that the motor/generator M/G reaches the predetermined rotational speed regardless of the load acting on the intermediate shaft 10.

If the operating pressure P1 of the first clutch C1 is the standby pressure P1s, and the operating pressure P2 of the second clutch C2 is the standby pressure P2s (YES in step #51), the control device 3 determines whether the engine E has started running (step #55). It is determined whether the engine has started running based upon detection signals input to the engine control device 15 from various sensors provided in the engine.

If the engine E has not started running (NO in step #55), the control device 3 leaves the operating pressure P2 of the second clutch C2 unchanged as equal to the standby pressure P2s (step #56). Meanwhile, the operating pressure P1 of the first clutch C1 is increased at a predetermined changing rate until it reaches a full engagement pressure P1e at which the first clutch C1 reaches a state of full engagement (step #57). During this time, the rotational speed control is also performed to maintain the rotational speed Rmg of the motor/generator M/G at the engine start rotational speed Res (step #58).

By increasing the operating pressure P1 of the first clutch C1 up to the full engagement pressure P1e at this time, the first clutch C1 passes through a state of half-engagement to become fully engaged. Therefore, the intermediate shaft 10, rotationally driven by the motor/generator M/G, and the crankshaft 11, synchronously rotating with the crankshaft (not shown) of the engine E, are connected. Accordingly, the crankshaft of the engine E is rotated by the driving force of the motor/generator M/G. In order to maintain the rotational speed Rmg of the motor/generator M/G at the engine start rotational speed Res, the output torque Tmg of the motor/generator M/G is increased only by the amount of torque required to crank the engine E (see area K in FIG. 7).

Thus, the second clutch C2 is released so that the motor/generator M/G is set to an idling state in which driving force therefrom is not transmitted to the output shaft 4, and a state (idle running state) is achieved in which fluctuations in the rotational speed Rmg of the motor/generator M/G do not affect the running condition of the vehicle. In such a state, the rotational speed Rmg of the motor/generator M/G can be increased up to a rotational speed capable of starting the engine E so as to perform starting of the engine E. Accordingly, even in cases where the rotational speed Rmg of the motor/generator M/G is low during motor running, the engine E can be reliably started, while maintaining a smooth operating condition of the wheel W in which fluctuations in the rotational speed Rmg of the motor/generator M/G are not transmitted to the wheel W during engine E starting.

If the engine E has started running (YES in step #55), the control device 3 determines whether the rotational speed Rmg of the motor/generator M/G is a rotational speed (hereinafter referred to as a "second clutch wheel-side rotational speed") Rw in accordance with a rotational speed on the wheel W side of the second clutch C2 (step #59). The second clutch wheel-side rotational speed Rw here is a rotational speed of the motor/generator M/G when the rotational speeds on the motor/generator M/G side (intermediate shaft 10 side) and wheel W side (speed change mechanism 7 side) of the second clutch C2 become almost identical within a predetermined difference in range. That is, the second clutch wheel-side rotational speed Rw is a rotational speed that differs depending on the speed selected in the speed change mechanism 7 and the vehicle running speed at that time. The vehicle running speed here can be detected by the vehicle speed sensor 18. Also note that the speed of the speed change mechanism 7 is controlled by the transmission control device 14.

Furthermore, in the determination made in step #59, the second clutch wheel-side rotational speed Rw is set to a value with a constant range, and it is preferable if a condition is determined as satisfied once the rotational speed Rmg of the motor/generator M/G falls within the range of the second clutch wheel-side rotational speed Rw.

If the rotational speed Rmg of the motor/generator M/G is not equal to the second clutch wheel-side rotational speed Rw (NO in step #59), the control device 3 leaves the operating pressure P2 of the second clutch C2 unchanged as equal to the standby pressure P2s (step #60). Meanwhile, the operating pressure P1 of the first clutch C1 is set to the standby pressure P1s (step #61). The rotational speed control is also performed to synchronize the rotational speed Rmg of the motor/generator M/G with the second clutch wheel-side rotational speed Rw (step #62).

The rotational speed control for setting the rotational speed Rmg of the motor/generator M/G to the second clutch wheel-side rotational speed Rw is based upon a second clutch wheel-side rotational speed Rw that is determined from information regarding the vehicle running speed detected by the vehicle speed sensor 18, and the speed selected in the speed change mechanism 7. Setting of the rotational speed Rmg of the motor/generator M/G to the second clutch wheel-side rotational speed Rw can be achieved by calculating the required output torque Tmg of the motor/generator M/G and then controlling the motor/generator M/G in accordance with the calculation results.

In this manner, the rotational speeds on the motor/generator M/G side and wheel W side of the second clutch C2 are synchronized. It is thus possible to suppress the generation and transmission of fluctuations in the driving force to the wheel side, through absorption of the difference in rotational speeds on the motor/generator M/G side and wheel W side when engaging the second clutch C2. Consequently, the smooth operating condition of the wheel can be maintained, and the application of a large load on the second clutch C2 during engagement of the second clutch C2 is suppressed.

If the rotational speed Rmg of the motor/generator M/G is equal to the second clutch wheel-side rotational speed Rw (YES in step #59), the control device 3 determines whether the operating pressure P2 of the second clutch C2 has reached the full engagement pressure P2e (step #63). That is, it is determined whether the second clutch C2 is fully engaged. If the operating pressure P2 of the second clutch C2 has not reached the full engagement pressure P2e (NO in step #63), the operating pressure P1 of the first clutch C1 is left unchanged as equal to the standby pressure P1s (step #64) and the operating pressure P2 of the second clutch C2 is set to the full engagement pressure P2e (step #65). During this time, the rotational speed control is also performed to maintain the rotational speed Rmg of the motor/generator M/G at the second clutch wheel-side rotational speed Rw (step #66). Thus, a state can be achieved in which the smooth operating condition of the wheel is maintained with the wheel W driven by the driving force of the motor/generator M/G.

Next, if the operating pressure P2 of the second clutch C2 has reached the full engagement pressure P2e (YES in step #63), the control device 3 set the status flag stored in the memory 23 to "E+M/G", which indicates engine+motor/generator running (step #67). Thus, the control (step #08) for engine+motor/generator running is performed as shown in the flowchart of FIG. 2. The control processing for engine starting during low speed is then ended.

Figure 7:
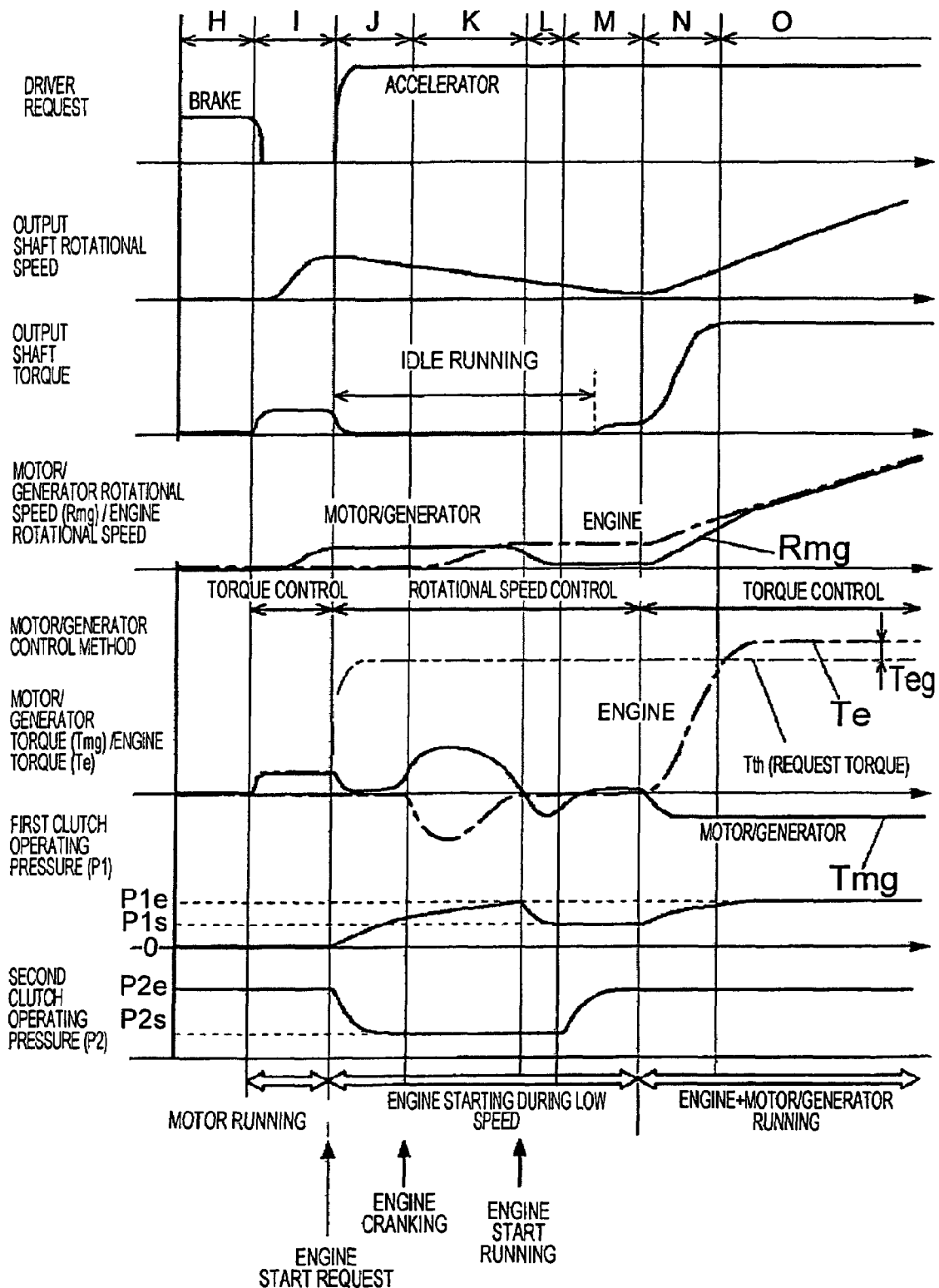
FIG. 7 is an example of a timing chart showing operating conditions of various portions when starting of an engine E is performed according to the control processing for "engine starting during low speed" in the drive apparatus for a hybrid vehicle according to the exemplary embodiment.

FIG. 7 is an example of a timing chart showing operating conditions of various portions when starting of an engine E is performed according to the control processing for "engine starting during low speed" after motor running is performed subsequent to the vehicle being stopped. In the example shown in the figure, the vehicle is stopped with the brake pedal being depressed by the driver (area H). Once the brake pedal is released by the driver, the control device 3 accordingly starts rotational driving of the motor/generator M/G. The control device 3 then outputs torque that slowly advances the vehicle, similar to the creeping of a vehicle with an automatic transmission that has a torque converter (area I). Thus, motor running is performed.

Next, once the accelerator pedal 19 is depressed by the driver, the control device 3 starts the control for engine starting during low speed. In the example shown in FIG. 7, the vehicle is first slowly moving forward with the accelerator pedal 19 not depressed. Following this state, the accelerator pedal 19 is depressed so hard that the output torque of only the motor/generator M/G becomes insufficient. Therefore, engine starting in this control is performed with the rotational speed Rmg of the motor/generator M/G at a low rotational speed that is less than the threshold rotational speed Rt. Namely, the operating pressure P1 of the first clutch C1 is set to the standby pressure P1s (see step #52 in FIG. 5), and the operating pressure P2 of the second clutch C2 is set to the standby pressure P2s (see step #53 in FIG. 5). An idling state (idle running state) is then achieved in which the driving force of the motor/generator M/G is not transmitted to the output shaft 4 (area J). At this time, the control device 3 starts the rotational speed control so as to maintain the rotational speed Rmg of the motor/generator M/G at the engine start rotational speed Res (see step #54 in FIG. 5).

Thereafter, the control device 3 continues to perform the rotational speed control for maintaining the rotational speed Rmg of the motor/generator M/G to the engine start rotational speed Res (see step #58 in FIG. 5). Meanwhile, the operating pressure P1 of the first clutch C1 is increased at a predetermined changing rate until it reaches the full engagement pressure P1e at which the first clutch C1 reaches a state of full engagement (see step #57 in FIG. 5) to start the engine E (area K). At this time, the output torque Tmg of the motor/generator M/G is increased only by the amount of torque required to crank the engine E.

After the engine E has started running, the control device 3 leaves the operating pressure P2 of the second clutch C2 unchanged as equal to the standby pressure P2s (see step #60 in FIG. 5). Meanwhile, the operating pressure P1 of the first clutch C1 is set to the standby pressure P1s (see step #61 in FIG. 5). The rotational speed Rmg of the motor/generator M/G is also synchronized with the second clutch wheel-side rotational speed Rw (see step #62 in FIG. 5) (area L).

Following this, the operating pressure P1 of the first clutch C1 is left unchanged as equal to the standby pressure P1s (see step #64 in FIG. 5), and the rotational speed Rmg of the motor/generator M/G is maintained at the second clutch wheel-side rotational speed Rw (see step #66 in FIG. 5). Furthermore, the operating pressure P2 of the second clutch C2 is set to the full engagement pressure P2e (see step #65 in FIG. 5). Thus, a state is achieved in which the wheel W is driven by the driving force of the motor/generator M/G (area M).

Note that according to the timing chart shown in FIG. 7, a control is performed to increase the operating pressure P2 of the second clutch C2 at a predetermined changing rate while synchronizing the rotational speed Rmg of the motor/generator M/G with the second clutch wheel-side rotational speed Rw. The purpose of this is to shorten the time needed to engage the second clutch C2.

However, as described using the flowchart in FIG. 5, a configuration is possible where the operating pressure P2 of the second clutch C2 starts to increase after the rotational speed Rmg of the motor/generator M/G is synchronized with the second clutch wheel-side rotational speed Rw. In this case, synchronizing the rotational speed Rmg of the motor/generator M/G with the second clutch wheel-side rotational speed Rw in a short time also results in shortening of the time needed to engage the second clutch C2.

Thereafter, engine+motor/generator running is started. More specifically, the output torque Tmg of the motor/generator M/G is decreased while the output torque Te of the engine E is increased. In addition, the operating pressure P1 of the first clutch C1 is increased at a predetermined changing rate until it reaches the full engagement pressure P1e (area N). While the operating pressure P1 of the first clutch C1 is being increased from the standby pressure P1s to the full engagement pressure P1e at this time, the output torque Te of the engine E continues to increase and transmission of the output torque Te of the engine E is performed while sliding the first clutch C1 in a half-engaged state. This consequently smoothes fluctuations in the output torque Te that is transmitted to the wheel W side.

With the engine+motor/generator running in a steady state, the output torque Te of the engine E becomes equal to a torque that is the sum of the request torque Tth and the torque (electricity generating torque) Teg required for generating electricity by the motor/generator M/G. Thus, while the vehicle runs on the output torque Te of the engine E, the motor/generator M/G is operated as a rotationally driven generator (area O).

As described above, when the control processing for engine starting during low speed is being executed, the control device 3 performs the rotational speed control for the motor/generator M/G in the areas J to M where the second clutch C2 is in a released state, and performs the torque control for the motor/generator M/G in the areas H, I, N, and O where the second clutch C2 is in a state of full engagement.

A description was provided in the above embodiment regarding a structure in which the rotational speed Rmg of the motor/generator M/G is detected based upon a detection signal from the rotational speed sensor 17, which detects the rotational speed of the intermediate shaft 10. However, the mechanism for detecting the rotational speed Rmg of the motor/generator M/G is not particularly limited to this, and any mechanism capable of directly or indirectly detecting the rotational speed Rmg of the motor/generator M/G may be employed. Thus, for example, another preferred embodiment may have a structure in which the rotational speed Rmg of the motor/generator M/G is indirectly detected based upon a detection signal from the vehicle speed sensor 18, which detects the rotational speed of the output shaft 4 of the transmission 2, and information regarding the selected speed in the transmission 2.

Further, two types of control patterns, control patterns for high and low speeds, were described in the above exemplary embodiment, whose use depends on the rotational speed Rmg of the motor/generator M/G, when there is an engine E start request during driving of the wheel W by only the motor/generator M/G. However, three or more control patterns for performing the start control of the engine E may also be employed, depending on the rotational speed Rmg of the motor/generator M/G.

According to the above exemplary embodiment, the control processing in area K of FIG. 7 involves performing a rotational speed control that maintains the rotational speed Rmg of the motor/generator M/G at the engine start rotational speed Res, while increasing the operating pressure of the first clutch at a predetermined changing rate. However, it is also possible to perform a control that rapidly increases the operating pressure to engage the first clutch. Although the load acting on the engine E becomes larger in such a case, the time needed for starting the engine E can be shortened.

In the above exemplary embodiment, the standby pressure P1s of the first clutch C1 was described as being set to a pressure that operates the first clutch C1 up to a state immediately prior to initiation of engagement. However, the standby pressure. P1s is not particularly limited to this, and any arbitrary pressure from zero pressure up to a pressure where the first clutch C1 is in a state immediately prior to initiation of engagement may be used.

What is claimed is:

1. A drive apparatus for a hybrid vehicle, comprising:
a motor;
a first clutch that transmits and cuts off driving force between the motor and an engine;
a second clutch that transmits and cuts off driving force to a wheel side from one or both of the motor and the engine; and
a control device that performs operation control for the motor, the first clutch and the second clutch, wherein:
the control device performs a control to start the engine by performing the operation control for the motor, the first clutch and the second clutch based upon control patterns that differ depending on a rotational speed of the motor that is directly or indirectly detected at a time when there is an engine start request during driving of the wheel by the motor, and
the second clutch transmits the driving force of the motor to the wheel when the second clutch is fully engaged.

2. The drive apparatus for a hybrid vehicle according to claim 1, wherein the control device has at least two control patterns, a control pattern for high speed and a control pattern for low speed, for use as the control patterns, and the control pattern for high speed is a control pattern that increases an engagement pressure of the first clutch, with the second clutch in a state of full engagement, to start the engine, and the control pattern for low speed is a control pattern that increases the engagement pressure of the first clutch, with the second clutch in a released state, to start the engine.

3. The drive apparatus for a hybrid vehicle according to claim 2, wherein the control device performs a control where the control pattern for high speed is selected if a rotational speed of the motor is equal to or greater than a threshold that is set equal to or greater than a rotational speed at which the engine can be started with the first clutch in an engaged state, and the control pattern for low speed is selected if the rotational speed of the motor is less than the threshold.

4. A drive apparatus for a hybrid vehicle, comprising:
a motor;
a first clutch that transmits and cuts off driving force between the motor and an engine;

a second clutch that transmits and cuts off driving force to a wheel side from one or both of the motor and the engine; and a control device that performs operation control for the motor, the first clutch and the second clutch, wherein:
the control device performs a control to start the engine with the second clutch in a released state if a rotational speed of the motor is less than a predetermined threshold when there is an engine start request during driving of the wheel by the motors,
the second clutch transmits the driving force of the motor to the wheel when the second clutch is fully engaged,
the rotational speed of the motor is detected at a time when there is the engine start request, and
the control device performs the control to start the engine based upon control patterns that differ depending on the rotational speed of the motor.

5. The drive apparatus for a hybrid vehicle according to claim 4, wherein the control device performs a rotational speed control for the motor with the second clutch in a released state, and performs a torque control for the motor with the second clutch in an engaged state.

6. The drive apparatus for a hybrid vehicle according to claim 5, wherein the threshold is set equal to or greater than a rotational speed at which the engine can be started.

7. The drive apparatus for a hybrid vehicle according to claim 4, wherein the threshold is set equal to or greater than a rotational speed at which the engine can be started.

8. A drive apparatus for a hybrid vehicle, comprising:
a motor;
a first clutch that transmits and cuts off driving force between the motor and an engine;
a second clutch that transmits and cuts off driving force to a wheel side from one or both of the motor and the engine; and
a control device that performs operation control for the motor, the first clutch and the second clutch, wherein:
the control device performs a control to start the engine when there is an engine start request during driving of the wheel by the motor,
the second clutch is released and the first clutch is engaged if a rotational speed of the motor is less than a predetermined threshold, and the rotational speed of the motor is set equal to or greater than a rotational speed at which the engine can be started,
following starting of the engine, the first clutch is released and the second clutch is engaged,
the second clutch transmits the driving force of the motor to the wheel when the second clutch is fully engaged,
the rotational speed of the motor is detected at a time when there is the engine start request, and
the control device performs the control to start the engine based upon control patterns that differ depending on the rotational speed of the motor.

9. The drive apparatus for a hybrid vehicle according to claim 8, wherein the control device performs a control when at least the second clutch is fully engaged after starting of the engine, in which the motor is rotationally driven at a rotational speed depending on a wheel-side rotational speed of the second clutch.

10. The drive apparatus for a hybrid vehicle according to claim 9, wherein the control device performs a rotational speed control for the motor with the second clutch in a released state, and performs a torque control for the motor with the second clutch in an engaged state.

11. The drive apparatus for a hybrid vehicle according to claim 10, wherein the threshold is set equal to or greater than a rotational speed at which the engine can be started.

12. The drive apparatus for a hybrid vehicle according to claim 8, wherein the control device performs a control when the second clutch is engaged after starting of the engine, in which an engagement pressure of the second clutch is increased while the rotational speed of the motor is synchronized with the wheel-side rotational speed of the second clutch.

13. The drive apparatus for a hybrid vehicle according to claim 12, wherein the control device performs a rotational speed control for the motor with the second clutch in a released state, and performs a torque control for the motor with the second clutch in an engaged state.

14. The drive apparatus for a hybrid vehicle according to claim 13, wherein the threshold is set equal to or greater than a rotational speed at which the engine can be started.

15. The drive apparatus for a hybrid vehicle according to claim 8, wherein the control device performs a control when the second clutch is engaged after starting of the engine, in which engagement of the second clutch is initiated after the rotational speed of the motor is synchronized with the wheel-side rotational speed of the second clutch.

16. The drive apparatus for a hybrid vehicle according to claim 15, wherein the control device performs a rotational speed control for the motor with the second clutch in a released state, and performs a torque control for the motor with the second clutch in an engaged state.

17. The drive apparatus for a hybrid vehicle according to claim 16, wherein the threshold is set to equal to or greater than a rotational speed at which the engine can be started.

18. The drive apparatus for a hybrid vehicle according to claim 8, wherein the control device performs a rotational speed control for the motor with the second clutch in a released state, and performs a torque control for the motor with the second clutch in an engaged state.

19. The drive apparatus for a hybrid vehicle according to claim 8, wherein the threshold is set equal to or greater than a rotational speed at which the engine can be started.

20. A control method of a drive apparatus for a hybrid vehicle which comprises a motor; a first clutch that transmits and cuts off driving force between the motor and an engine; and a second clutch that transmits and cuts off driving force to a wheel side from one or both of the motor and the engine, the control method comprising:
starting the engine when there is an engine start request during driving of the wheel by the motor by releasing the second clutch and engaging the first clutch if a rotational speed of the motor is less than a predetermined threshold, and then setting the rotational speed of the motor equal to or greater than a rotational speed at which the engine can be started; and
following starting of the engine, releasing the first clutch and engaging the second clutch, wherein:
the second clutch transmits the driving force of the motor to the wheel when the second clutch is fully engaged,
the rotational speed of the motor is detected at a time when there is the engine start request, and
the control to start the engine is performed based upon control patterns that differ depending on the rotational speed of the motor.

* * * * *